(12) United States Patent
Leonowich et al.

(10) Patent No.: US 6,687,286 B1
(45) Date of Patent: Feb. 3, 2004

(54) PROGRAMMABLE TRANSMITTER CIRCUIT FOR COUPLING TO AN ETHERNET OR FAST ETHERNET

(75) Inventors: Robert Henry Leonowich, Muhlenberg Township, PA (US); Ayal Shoval, Whitehall, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/465,683

(22) Filed: Dec. 17, 1999

(51) Int. Cl.[7] .............................. H04L 5/16; H04L 7/02
(52) U.S. Cl. ..................................... 375/219; 375/361
(58) Field of Search ................................ 375/219, 220, 375/222, 232, 361; 327/237; 341/153; 359/152; 709/217; 455/73; 710/1

(56) References Cited

U.S. PATENT DOCUMENTS

| | | | | |
|---|---|---|---|---|
| 5,422,919 A | * | 6/1995 | Graham ...................... | 375/200 |
| 5,764,394 A | * | 6/1998 | Yamazaki et al. .......... | 359/152 |
| 5,936,450 A | * | 8/1999 | Unger ......................... | 327/237 |
| 6,112,232 A | * | 8/2000 | Shahar et al. ............... | 709/217 |
| 6,172,634 B1 | * | 1/2001 | Leonowich et al. ........ | 341/153 |
| 6,304,598 B1 | * | 10/2001 | Agazzi et al. .............. | 375/232 |
| 6,470,053 B1 | * | 10/2002 | Liu .............................. | 375/257 |
| 2002/0154684 A1 | * | 10/2002 | Chan ........................... | 375/220 |

OTHER PUBLICATIONS

Everitt, A 10/100Mb/s CMOS Ethernet Transceiver for 10BaseT, 100BaseTX, and 100BaseFX, Digest of Technical Paper, ISSCC98, Feb. 6, 1998, p. 210–211.*

J. Everitt et al., "A CMOS Transceiver for 10–Mb/s and 100–Mb/s Ethernet", Dec. 1998, IEEE Journal Solid –State Circuits, vol. 33, No. 12, pp.–2169–2177.*

"Carrier Sense Multiple Access With Collision Detection (CSMA/CD) Access Method and Physical Layer Specifications", ISO/IEC 8802–3, ANSI/IEEE Std. 802.3, Fourth Edition Jul. 8, 1993.

"Fibre Distributed Data Interface (FDDI) —Token Ring Twisted Pair Physical Layer Medium Dependent (TP–PMD)", ANSI X3. 263–1995, Sep. 1995, pp. 27–32.

J. Everitt et al., "A CMOS Transceiver for 10–Mb/s and 100–Mb/s Ethernet", IEEE Journal Solid–State Circuits, vol. 33, No. 12 pp. 2169–2177, Dec. 1998.

* cited by examiner

Primary Examiner—Stephen Chin
Assistant Examiner—Sam K. Ahn (57) ABSTRACT

A single, 10/100 twisted-pair driver for Ethernet and Fast Ethernet applications designed in a 0.25 $\mu$m, 3.3V, digital CMOS process is described. The combined driver sources either 10 Mbaud Manchester data or 125 Mbaud MLT3/NRZI data. In 10 Mbaud mode the driver incorporates programmable features such as an additional common-mode current for various linearity performance as function of power supply dissipation. In 125 Mbaud mode of operation, the driver can be configured for different duty cycle distortion and for various rise and fall-times as a trade-off in EMI performance and remote receiver cable length performance. As well, rise/fall-time asymmetry performance is programmable as a trade-off in supply power dissipation. The driver can be run optimally during a transition and sub-optimally when sending multiple "0" symbols to save power. These power dissipation numbers can be reduced through programmable modes when more relaxed performance targets are acceptable.

15 Claims, 9 Drawing Sheets

| SYMBOL | $I_{L_n}$ | $I_{R_n}$ | $I_{L_p}$ | $I_{R_p}$ |
|---|---|---|---|---|
| 0 | 0 | 0 | 0 | 0 |
| +1 | 30mA | 10mA | -10mA | 10mA |
| -1 | 10mA | -10mA | -30mA | -10mA |

FIG. 7B

| SYMBOL | $I_{L_n}$ | $I_{R_n}$ | $I_{L_p}$ | $I_{R_p}$ |
|---|---|---|---|---|
| 0 | θ | 0 | -θ | 0 |
| +1 | 30mA | 10mA | -10mA | 10mA |
| -1 | 10mA | -10mA | -30mA | -10mA |

FIG. 7C

| SYMBOL | $I_{L_n}$ | $I_{R_n}$ | $I_{L_p}$ | $I_{R_p}$ |
|---|---|---|---|---|
| 0->1 | 30-θmA | 10mA | -10+θmA | 10mA |
| 0->-1 | 10-θmA | -10mA | -30+θmA | -10mA |
| 1->0 | θ-30mA | -10mA | -θ+10mA | -10mA |
| -1->0 | θ-10mA | 10mA | -θ+30mA | 10mA |

PROGRAMMABLE TRANSMITTER CIRCUIT FOR COUPLING TO AN ETHERNET OR FAST ETHERNET

FIELD OF THE INVENTION

This invention relates generally to integrated electronic circuits, and more specifically to line drivers for data transmission.

BACKGROUND OF THE INVENTION

A 10/125 Mbaud fast Ethernet transceiver requires a line driver that can accommodate the line code for both 10 Mbaud and 125 Mbaud data rates. In addition, the line driver must meet stringent standard specifications. Also, with today's applications demanding smaller component size and smaller power supplies, it is desirous to implement the line driver at low voltages, within a small area, and at low power. Typical solutions to this problem at 5V have either employed two or three separate drivers, and do not offer the flexibility of programmability for various standard specifications.

In 10 Mbaud mode, the IEEE standard (Carrier Sense Multiple Access With Collision Detection (CSMA/CD) Access Method and Physical Layer Specifications, ISO/IEC 8802-3, ANSI/IEEE std. 802.3, Fourth edition Jul. 8, 1993) requires the transmitter to source a filtered Manchester code. The filtered output signal is a combination of a 5 MHz and a 10 MHz sinusoid of $5V_{pp}$ amplitude level. In addition, the standard specification on linearity requires that the transmitter must maintain greater than 27 dB harmonic distortion suppression. The allowed amplitude variation is ±10% about the nominal level.

In 125 Mbaud mode, two sub-modes must be supported; a three level line code, MLT3 and a two level NRZI line code. The IEEE standard (Fibre Distributed Data Interface (FDDI)—Token Ring Twisted Pair Physical Layer Meduim Dependent (TP-PMD), ANSI X3.263-1995, September 1995) requires that the MLT3 line code have a rise and fall-time between 3 ns and 5 ns with symmetry of 0.5 ns and peak-to-peak jitter less than 1.4 ns. The maximum allowed skew between a rise transition and a fall transition (also known as duty cycle distortion), when measured at $$\frac{V\,pk}{2} = 0.5\text{ V},$$

must be no greater than 0.5 ns. In addition, the transmit amplitude must be $1V_{pk}\pm5\%$.

Power dissipation is also a concern. It is desirable that a given function have a lowest possible power dissipation. However, practical limitations yield an overhead power that must be dissipated. Thus, it is desired to minimize this overhead, or alternatively, maximize power efficiency. Typical twisted pair drivers for Ethernet and fast Ethernet do not work below 3V and are large because multiple drivers are implemented (J. Everitt, J. F. Parker, P. Hurst, D. Nack and K. R. Konda, "A CMOS Transceiver for 10-Mb/s and 100-Mb/s Ethernet," IEEE J. Solid-State Circuits, vol. 33, pp. 2169–2177, December; and R. H. Leonowich, O. Shoaei, and A Shoval, "Methods and Apparatus for Providing Analog-FIR-Based Line-Driver with Pre-Equalization," U.S. Patent submission, March 1998).

Figure 1:
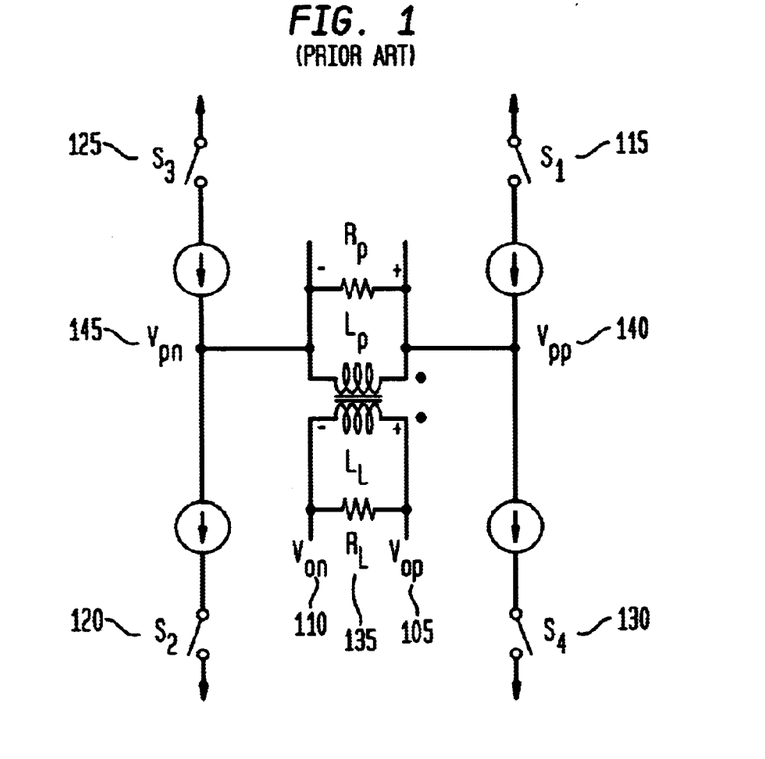
FIG. 1 is a schematic diagram illustrating a typical line driver known in the art.

A prior art line driver is shown in FIG. 1. In 100 Base-TX mode the IEEE specifications require $\pm1V_{pk}$ between nodes $v_{op}$ 105 and $v_{on}$ 110 when transmitting digital "1", and 0V when transmitting digital "0". Hence, a "1" is achieved by closing switches $S_1$ 115 and $S_2$ 120 and opening switches $S_3$ 125 and $S_4$ 130. A "0" is achieved by opening all four switches. Using a 1:N transformer and a peak voltage $v_{op}105-v_{on}110=1V_{pk}$, the following current is required from the line driver for $R_L 135=100\Omega$, assuming the most power demanding 4 bit repetitive pulse sequence [0 1 0–1] is being transmitted:

$$I_{av} = \frac{20N + 0 + 20N + 0}{4} = 10NmA \qquad (1)$$

The total power dissipation is therefore 10 $NV_{dd}$ mW. The voltage between the nodes $v_{pp}$ 140 and $v_{pn}$ 145 is thus $$\frac{V_{pk}}{N}.$$

The current the device must source at its output pins is therefore increased by a factor N while the voltage is reduced by the same factor relative to the current and voltage seen at the load, $R_L$ 135. Having N>1 increases the current the driver must source, hence increasing total supply power dissipation. This choice is not desirable if the goal is to minimize power supply dissipation. Choosing N<1 certainly helps reduce power dissipation, however this is not desirable in 100 Base-TX mode due to reduced transformer bandwidth performance and is impractical in 10 Base-T mode where a 2.5 N $V_{pk}$ signal is required from a 3V supply. Therefore, a 1:1 transformer must be used. This ideal driver would thus dissipate a minimum of $$P_{av}=(10\text{ mA})V_{dd}=33\text{ mW} \qquad (2)$$

In 10 Base-T mode the IEEE specifications require $\pm2.5V_{pk}$ between nodes $v_{op}$ 105 and $v_{on}$ 110. The transmit symbols are either a 10 MHz sinusoidal pulse (single bit) or a 5 MHz pulse (double bit). Thus, a 10 MHz pulse requires for all "1"s data (continuous 10 MHz sinusoid)

$$I_{av} = \frac{2}{\pi}I_{max} = \frac{2}{\pi}50mA = 32mA \qquad (3)$$

for a total power dissipation at 3.3V of $$P_{av10}=105\text{ mW, for all "1"s data} \qquad (4)$$

Figure 2:
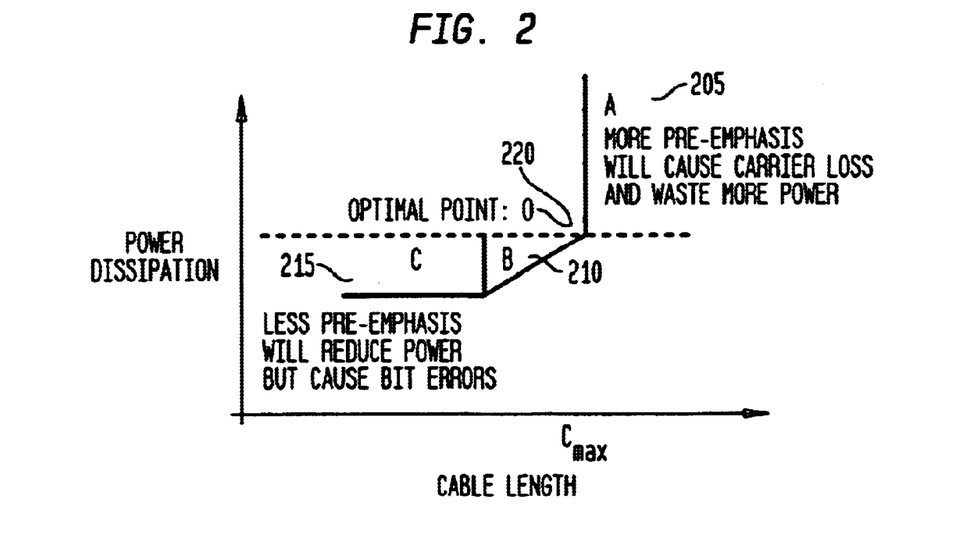
FIG. 2 is a graph illustrating the relationship between power dissipation and cable length.

In 10 Base-T mode, receive equalization is not employed, hence there exists some cable length, $C_{max}$, at which the transmitted $5V_{pp}$ 10 MHz pulse will be attenuated by the cable and will be too small to be detected by another entity on the Ethernet. Since cable attenuation is a function of frequency, the 5 MHZ pulse will not suffer as much loss as the 10 MHz pulse. As a result, the 5 MHz preamble will be detected and the 10 MHz sinusoid pulse will cause carrier loss. It is therefore desirable to shape the 5 MHz pulse such that after passing through a cable of length $C_{max}$, both the 10 MHz pulse and the 5 MHz pulse have the same amplitude. Shaping of the 5 MHz pulse is signal pre-emphasis. The average current dissipated when transmitting a 5 MHz pulse is proportional to the amount of pre-emphasis. The more emphasis, the more power dissipation. Therefore, a design trade-off exists between power dissipation and maximum cable length that can be accommodated. FIG. 2 is a graph illustrating the relationship between power dissipation and cable length. In FIG. 2, region A 205 shows the over-emphasized region where more power is dispensed (more emphasis), and does not imply improved cable performance.

Region A 205, is an undesirable region of operation because carrier loss will occur. Region B 210 is the proper region of operation where less pre-emphasis reduces the received 5 MHz amplitude relative to the 10 MHz pulse and hence, for error free performance, the cable length must be reduced as emphasis is reduced to reduce power dissipation. Region C 215 occurs where the less pre-emphasis makes the 5 MHz pulse width too narrow to represent a double bit at any cable length. The average current dissipated in 10 Base-T mode is therefore from (3)

$$I_{av} = 50\left[\frac{2}{\pi}\rho + (1-\rho)\kappa\right] mA \quad (5)$$

where $\rho$ represents the percentage of 10 MHz pulses over time and $\kappa$ represents the scale factor for the current, $I_{max}$, as function of pre-emphasis. Recall from (3) that for $2.5V_{pk}$ on the 100Ω load, we require $I_{max}$=50 mA to generate a 5 MHz square wave pulse. For equally likely 10 MHz and 5 MHz pulses, $\rho$=0.5, and with $\kappa$=0.8 (about 50% emphasis) and at 3.3V supplies we obtain a minimal power dissipation of $$P_{av}=I_{av}=V_{dd}=119 \text{ mW, for random data} \quad (6)$$

This condition occurs when $C_{max}$=140 m for CAT3 cable for which the 5 MHz and 10 MHz received amplitudes are similar. This condition is depicted by point O 220 in FIG. 2. From (5) we note that if the 5 MHz shaping were not employed, $P_{av}$=135 mW, hence pre-emphasis provides a 16 mW savings when $\kappa$=0.8.

SUMMARY OF THE INVENTION

The present invention provides a single integrated programmable transmitter circuit, for Ethernet as well as Fast Ethernet applications including a line driver portion, a control portion, and a FIR filter portion.

The line driver accommodates binary encoded data and provides output data encoded in one of three selectable formats. These formats include Manchester encoding, MLT3, or NRZI. The line driver receives Manchester encoded data at a data rate of 10 Mbaud. MLT3 and NRZI data are encoded by the line driver by the control logic, and output at a data rate of 125 Mbaud.

In the 10 Mbaud mode, harmonic distortion is tunable, allowing a trade-off between power dissipation and performance. In the 125 Mbaud mode the transmitted data duty cycle, rise-time slew rate, fall-time slew rate, and rise-time and fall-time asymmetry are programmable, allowing a trade off between power dissipation and performance. These transmitted data parameters are adjustable. Proper selection of the adjustable parameters enables the transmitter circuit to meet specific performance requirements, such as those described in IEEE standards. Amplitude control is employed in all modes in an effort to maintain constant maximum transmit amplitude.

BRIEF DESCRIPTION OF THE DRAWINGS

The invention is best understood from the following detailed description when read in connection with the accompanying drawings.

DETAILED DESCRIPTION OF THE INVENTION

The invention is best understood from the following detailed description when read in conjunction with the accompanying drawings.

Figure 3:
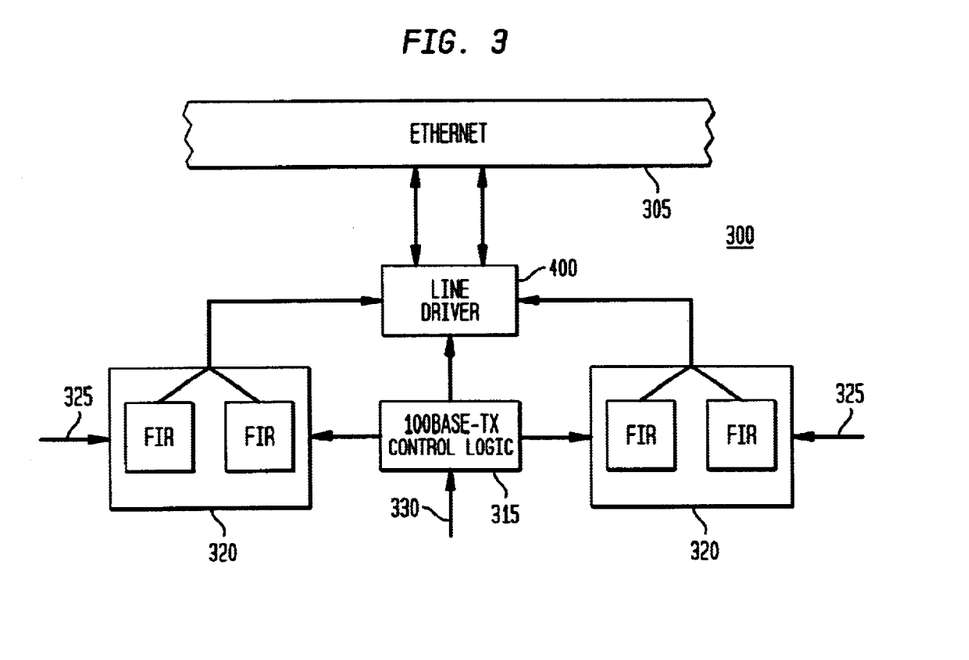
FIG. 3 is a block diagram illustrating an exemplary embodiment of a single programmable transmitter circuit.

FIG. 3 is a block diagram illustrating an exemplary embodiment of a single programmable transmitter circuit, 300 for Ethernet 305 as well as and Fast Ethernet applications, comprising a line driver 400, control logic 315, and a finite impulse response (FIR) filter 320. The line driver 400 receives Manchester encoded data 325 at a data rate of 10 Mbaud from the FIR filter 320. The line driver 400 receives binary encoded data 330 at a data rate of 125 Mbaud from the control logic 315.

An exemplary embodiment of the invention is a single 3.3V transmitter circuit 300 that can be configured in either one of the three modes of operation and offers programmability of various standard specifications. Another exemplary embodiment of the transmitter circuit 300 operates with a supply voltage ($V_{dd}$) of only 2V. Also, in 10 Mbaud mode, the pre-emphasis level and harmonic distortion are tunable allowing a trade-off between power and performance. In 125 Mbaud mode, the rise-times and fall-times of the transmit output pulses are programmable. In addition, feedback is employed in all modes to maintain constant maximum transmit amplitude. The transmitter circuit 300 accommodates all three modes of operation through active circuit re-use, hence reducing area and power requirements.

In an exemplary embodiment, the single transmitter circuit 300 meets the 10 Mbaud mode IEEE standard (Carrier Sense Multiple Access With Collision Detection (CSMA/CD) Access Method and Physical Layer Specifications, ISO/IEC 8802-3, ANSI/IEEE std. 802.3, Fourth edition Jul. 8, 1993) requirement to source a filtered Manchester code. The filtered output signal is a combined 5 MHz and a 10 MHz sinusoid of $5V_{pp}$ amplitude level. Pre-emphasis is used to ensure robust performance. The single transmitter also meets the IEEE standard linearity requirement that the transmitter circuit maintain greater than 27 dB harmonic distortion suppression. The allowed amplitude variation is ±10% about the nominal level.

An exemplary embodiment of the invention 300 comprises a 125 Mbaud mode in which two sub-modes are supported: a three level line code MLT3 and a two level NRZI line code. This embodiment meets the IEEE standard ("Fibre Distributed Data Interface (FDDI)—Token Ring Twisted Pair Physical Layer Medium Dependent (TP-PMD)," ANSI X3.263-1995, September 1995) requirement that the MLT3 line code have a rise-time and fall-time between 3 ns and 5 ns with symmetry less than 0.5 ns and peak-to-peak jitter less than 1.4 ns. Also according to this standard, the maximum allowed skew between a rise transition and a fall transition (also known as duty cycle distortion), when measured at $$\frac{V_{pk}}{2} = 0.5V$$

must be no greater than 0.5 ns (subtracting the 8 ns bit time). In addition, the transmit amplitude must be $1V_{pk}\pm 5\%$. Although exemplary embodiments of the invention meet the above IEEE performance requirements, the invention functions without meeting these standards.

Figure 4:
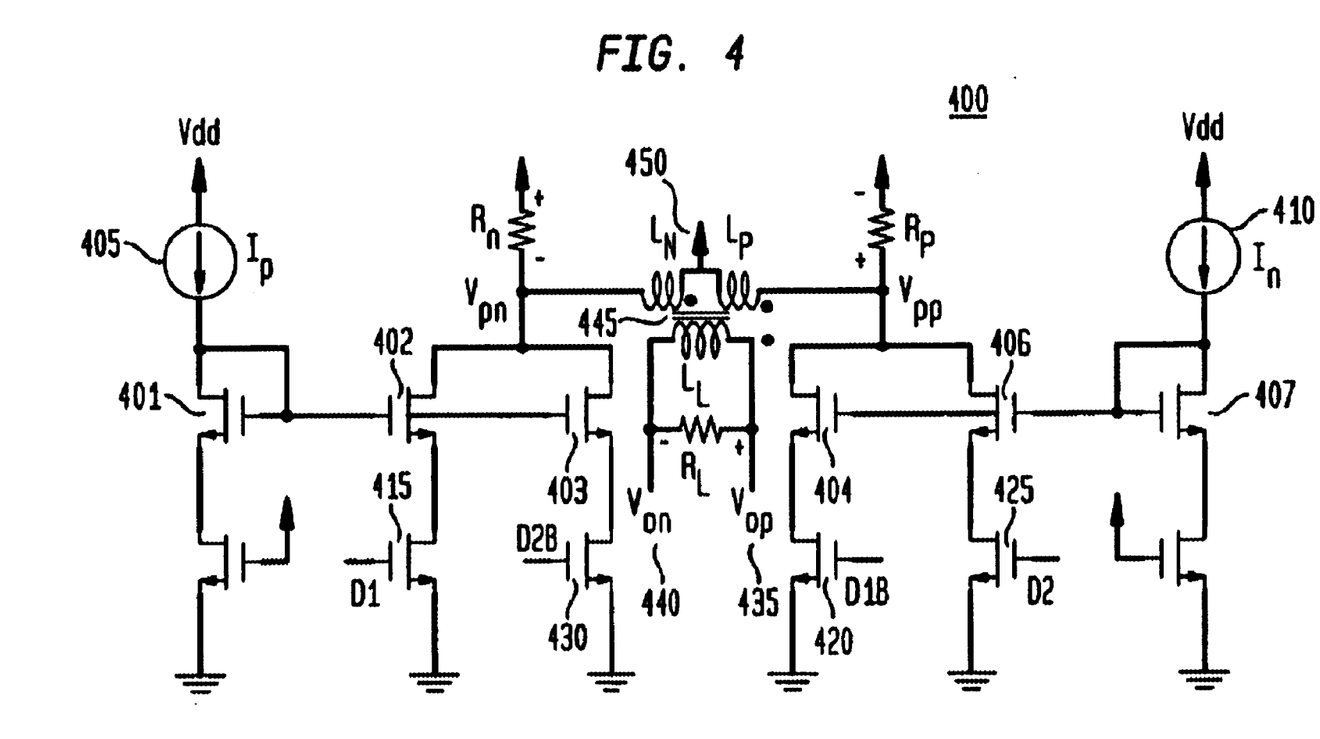
FIG. 4 is a schematic diagram illustrating an exemplary embodiment of the line driver.
Figure 5A:
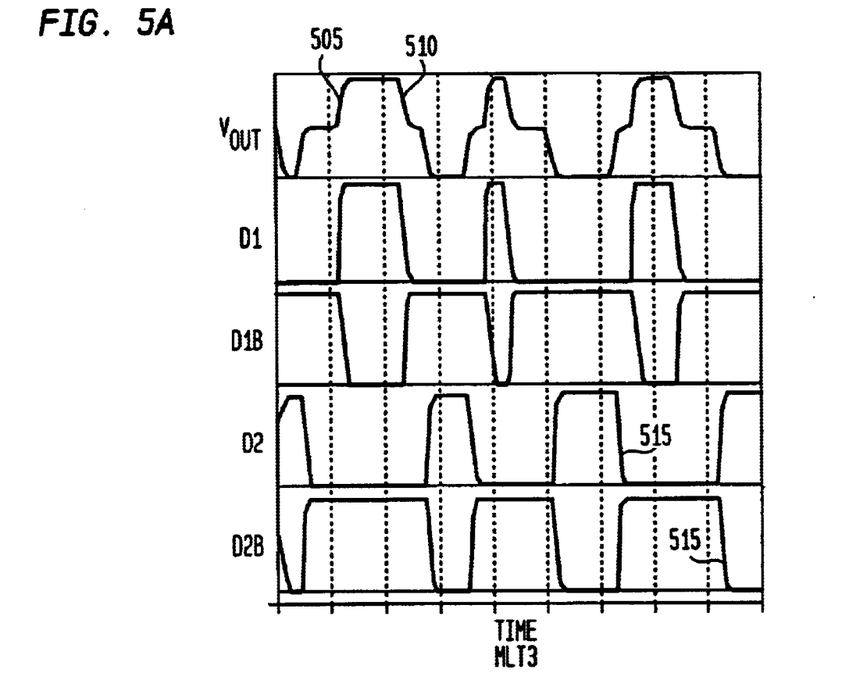
FIG. 5 is a timing diagram illustrating an exemplary embodiment of the relationship between the voltage representations of D1, D1B, D2, D2B, and the output voltage for this circuit in the MLT3 and NRZI modes.
Figure 5B:
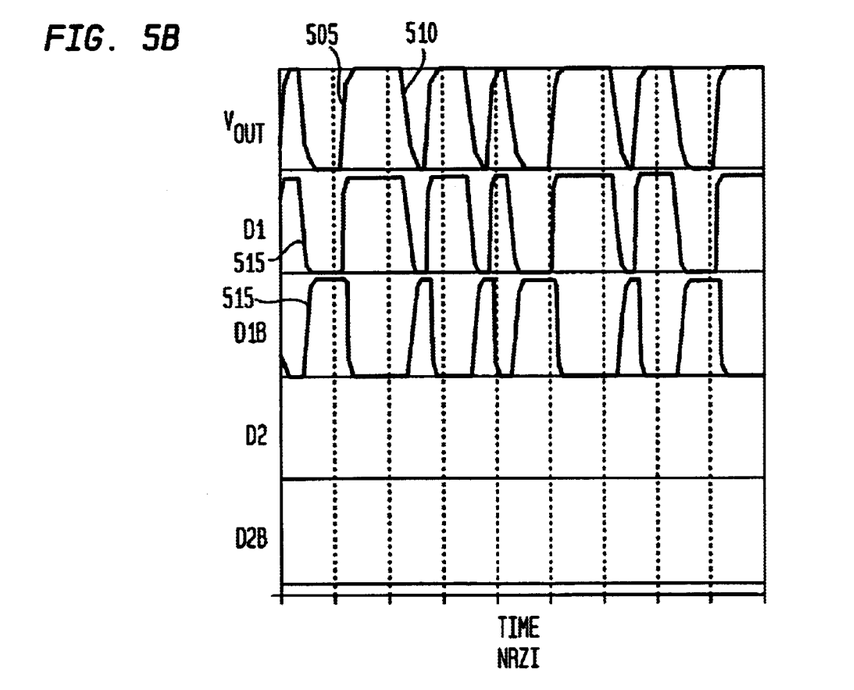

FIG. 4 is an exemplary embodiment of a schematic diagram illustrating the line driver 400. Operation in 125 Mbaud mode is as follows: both $I_p$ 405 and $I_n$ 410 are DC constant current sources connected to the supply voltage, $V_{dd}$. The gates of transistors 401, 402, and 403 are electrically coupled to current source $I_p$ 405. Transistors 401, 402, and 403 conduct when current $I_p$ is present. The gates of transistors 404, 406, and 407 are electrically coupled to current source $I_n$ 410. Transistors 404, 406, and 407 conduct when current $I_n$ is present. The signals D1, D1B, D2, and D2B are pulses used to control transistors 415, 420, 425, and 430 respectively to produce either MLT3 or NRZI pulses at the line driver output stage $v_{op}$ 435 and $v_{on}$ 440. FIG. 5 is a timing diagram illustrating an exemplary the relationship between the voltage representations of D1, D1B, D2, and D2B, and the output voltage for this circuit in the MLT3 and NRZI modes. The output voltage rise-times 505 and fall-times 510 are achieved, in part, by controlling the slew-rate 515 of the D signals, D1, D1B, D2, and D2B. Note that the labeling of rise-time 505, fall-time 510, and slew rate 515 in FIG. 5 is for illustrative purposes only and is intended to indicate the portion of the signal waveform, and is not intended to indicate a correspondence between a specific rise/fall-time and a specific slew rate.

Figure 6:
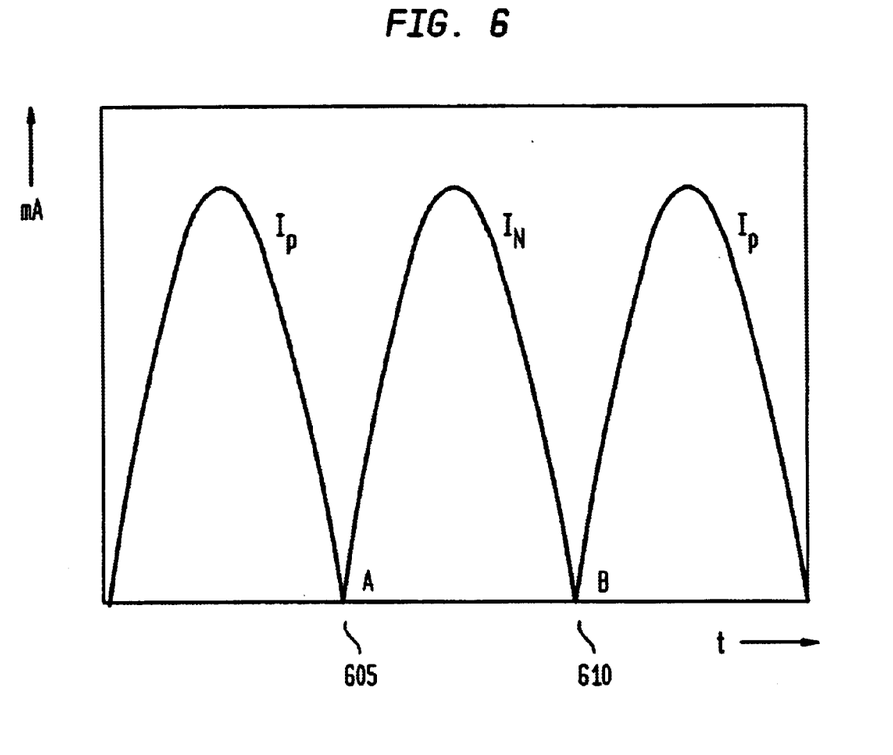
FIG. 6 is graph illustrating an exemplary embodiment of the push-pull characteristics of the line driver currents.

In 10 Mbaud mode, the gates of transistors 415, 420, 425, and 430, (representing the D signals) are connected to a HIGH potential. The currents $I_p$ 405 and $I_n$ 410 are coupled to the FIR filter 320 that produces the required filtered Manchester code. The class B nature of operation (i.e., when $I_p$ 405 pulses, $I_n$ 410 is zero; when $I_n$ 410 pulses, $I_p$ 405 is zero) as depicted in FIG. 6, will lead to zero-crossing distortion 605, 610 and affect linearity. Compensation against this distortion, as well as the pre-emphasis mechanism are required and addressed below. The transformer 445, which is not part of the integrated circuit, is used to invert the signal. Thus, a $5V_{pp}$ signal out is obtained from a of 3V supply using a 1:1 transformer. This embodiment of the line driver 400 requires minimal area and allows operation at less than 3V supplies.

The line driver 400 is class B, hence when one side of the primary 450 is driven by the active current source, the current source on the opposite side floats. The result is that the transformer 445 is effectively a 1:2 transformer. Analysis of this embodiment of the line driver when transmitting a positive pulse at peak amplitude yields:

$$I_L = \frac{V_{pk}}{100\Omega} \qquad (7)$$

$$I_{R_n} = I_L = I_{R_p} = -I_{L_p} = \frac{I_p}{4} \qquad (8)$$

$$I_{L_n} = \frac{3I_p}{4} \qquad (9)$$

This results in a minimum of $$I_p = \frac{4V_{pk}}{100\Omega} \qquad (10)$$

to transmit the full peak amplitude as specified in the IEEE standards.

Figure 7A:
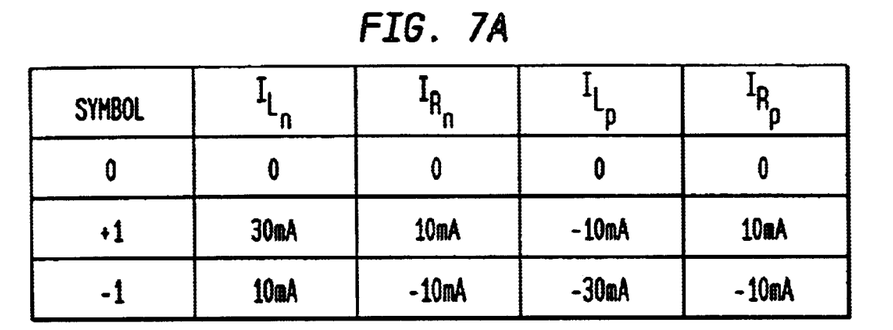
FIG. 7(a) is a table illustrating an exemplary current distribution for components of the line driver.
Figure 7B:
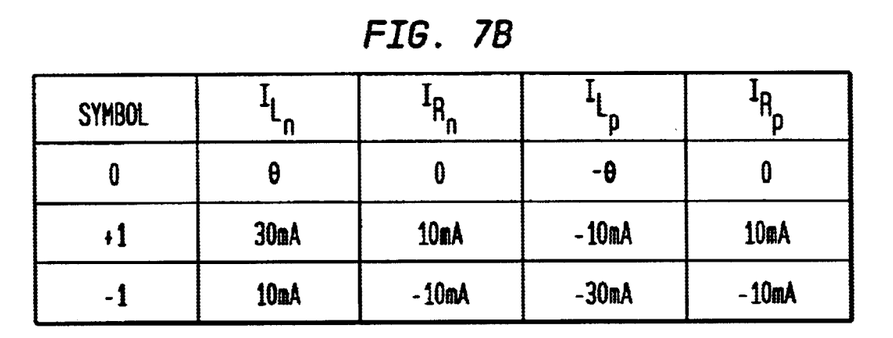
FIG. 7(b) is a table illustrating an exemplary current distribution for the components of the line driver.
Figure 7C:
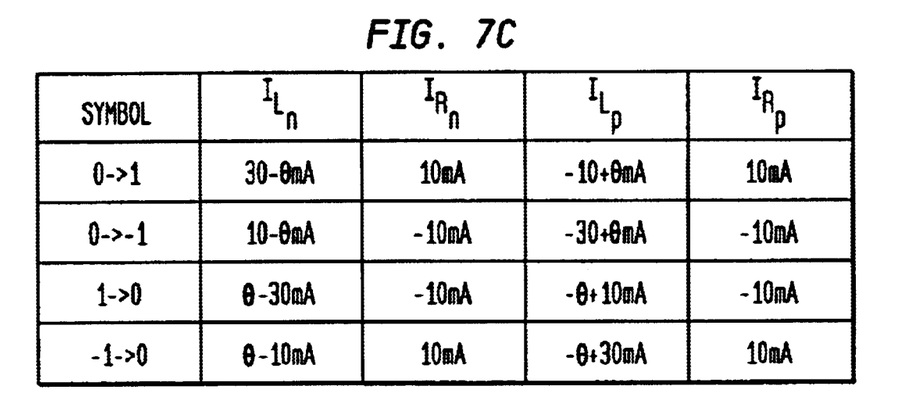
FIG. 7(c) is a table illustrating an exemplary embodiment of the change in current in the resistors and conductors of the line driver
Figure 8:
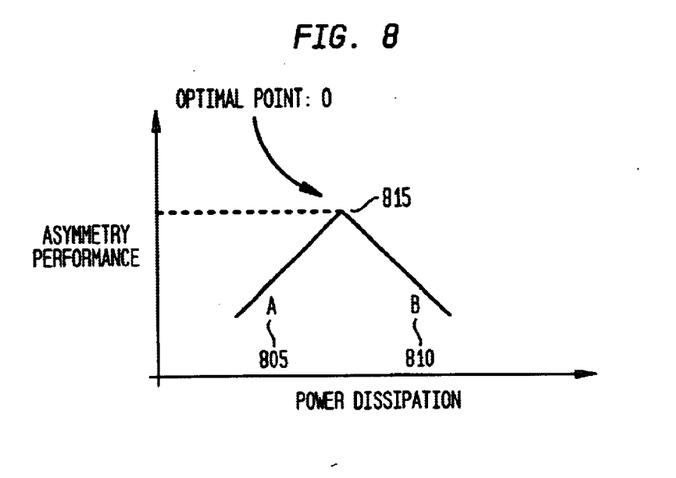
FIG. 8 is a graph illustrating an exemplary embodiment of the tradeoff between power dissipated and asymmetry performance.

In 100 Base-TX mode, the line driver 400 must supply 40 mA to transmit a "1" or "−1" symbol and 0 mA to transmit a "0" symbol. FIG. 7(a) is a table illustrating an exemplary embodiment of the current distribution for components of the line driver 400, for each transmitted symbol. As illustrated in FIG. 7(a) each inductor and resistor in the circuit experiences a different change in current. Therefore, non-equal rise and fall-times occur and violate the tight standard specifications which require symmetry between rise-time and fall-time within 0.5 ns for the maximum allowed skew. To achieve better symmetry it is preferred to slew the output nodes on all transitions. One embodiment dissipates an additional common-mode current when sending a "0" symbol. FIG. 7(b) is a table illustrating an exemplary embodiment of the current distribution for the components of the line driver 400 when an additional common mode current is dissipated, when sending a "0" symbol. FIG. 7(c) is a table illustrating an exemplary embodiment of the change in current in the resistors and conductors of the line driver 400, after a transition. Minimum asymmetry occurs when the change in current through each component is equal. Minimum asymmetry occurs when the drive and decay source currents are similar. This occurs when θ=20 mA in equation (11). An embodiment of the invention implements θ=20 mA in equation (11). Thus, there exists a trade-off between power and performance. FIG. 8 is a graph illustrating an exemplary embodiment of the tradeoff between power dissipated and asymmetry performance. Specifically, region A 805 shows the asymmetry performance decreases as power is decreased. Region B 810 shows that more common-mode current increases power, but does not improve performance. Point O 815 indicates the optimal point of operation. For the [0, 1, −1, 0] pulse sequence the driver dissipates an average current of $$I_{av} = \frac{40 + 2\theta + 40 + 2\theta}{4} = (20 + \theta)mA \qquad (11)$$

and at 3.3V, with θ=20 mA, the total power dissipation is therefore $$P_{av} = I_{av}V_{dd} = 132 \text{ mW} \qquad (12)$$

Based on equation (10), in 10 Base-T mode, an embodiment of the line driver must source a maximum of 100 mA. The power dissipation for an all "1" or all "0" pattern (continuous 10 MHz sinusoid) is $$P_{av} = I_{av}V_{dd} = 210 \text{ mW, for all "1"s data} \qquad (13)$$

An exemplary embodiment of the transmitter circuit 300 is programmable such that a choice exists between different common-mode current (via θ) in 100 Base-TX mode as a trade-off between power and performance. In 10 Base-T mode, pre-emphasis levels (via α) are programmable to allow for optimal performance and power dissipation requirements.

An FIR filter that synthesizes the filtered Manchester code is used to generate the currents $I_p$ 405 and $I_n$ 410 for the circuit in FIG. 4. This FIR filter is described in an application for patent, Ser. No. 09/030276, filing date: Feb. 25, 1998, title: Methods and Apparatus for Providing Analog-FIR-Based Line-Driver with Pre-equalization, and is hereby incorporated by reference. Specifically, a 10 MHz sinusoid according to the following tap coefficients is generated.

$$a_k = \sin(2\pi f_0 nT) \quad (14)$$

where $f_0$=10 MHz and T is the FIR sampling rate which is 160 MHz. Hence, one complete cycle of the 10 MHz sinusoid can be represented by the coefficient vector a where:

$$a = [0 \; 0.3829 \; 0.7071 \; 0.9239 \; 1] \quad (15)$$

The FIR filter consists of a current switching DAC whose coefficients are turned on sequentially. This requires the difference coefficients $b_k = a_k - a_{k-1}$, where:

$$b[0 \; 0.3829 \; 0.3244 \; 0.2168 \; 0.0761] \quad (16)$$

A 10 Base-T receiver does not have cable equalization, hence transmitter pre-equalization is required. For this reason the FIR filter makes use of the following coefficients $c_k = b_k/4$ where:

$$c[0 \; 0.0957 \; 0.0811 \; 0.0542 \; 0.0190] \quad (17)$$

The reason for this vector becomes apparent when the 5 MHz component of the transmit waveform is synthesized.

The FIR filter consists of two identical sections: one for the raw signal, S, and one for the pre-emphasis component, P. The output at time $T_0+nT$ where $T_0$ is the start time is:

$$y_{10}(T_0 + nT) = 2K_p \sum_{i=1}^{4} P_i(T_n) + 2K_s \sum_{i=1}^{4} S_i(T_n) \quad (18)$$

where $K_p$ and $K_s$ are scalers such that $K_p+K_s=1$. These are used to provide pre-emphasis.

Note that the expression in (18) is normalized, that is, at the peak amplitude:

$$y_{10}(T_0 + 4T) = y_{10}(T_4) = 2K_p \left[\sum_{i=1}^{4} c_i\right] + 2K_s \left[\sum_{i=1}^{4} c_i\right] = 1 \quad (19)$$

For 5 MHz output currents:

$$y_s(T_0 + nT) = K_p \sum_{i=1}^{4} P_{ai}(T_n) + K_p \sum_{i=1}^{4} P_{bi}(T_n) + 2K_s \sum_{i=1}^{4} S_{ai}(T_n). \quad (20)$$

Figure 9:
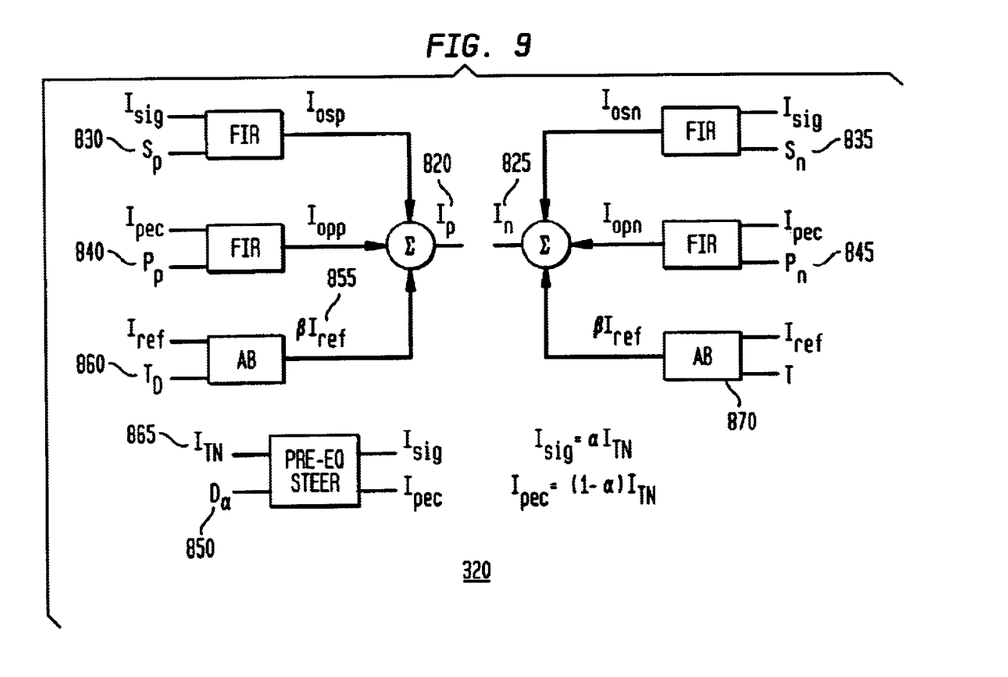
FIG. 9 is a block diagram illustrating an exemplary embodiment of a FIR filter.

Notice that $$\alpha = \frac{y_s(T_0 + 12T)}{y_s(T_0 + 4T)} = \frac{K_s}{K_s + K_p} \quad (21)$$

is the adjustable pre-emphasis parameter. For example, α=0.5, results in 50% pre-emphasis. An embodiment of the transmitter circuit 300 parameterizes α from 0 to 1 in 0.1 increments, thus providing programmable pre-emphasis. FIG. 9 is a block diagram illustrating an exemplary embodiment of a FIR filter generating $I_p$ 820 and $I_n$ 825. The vectors $S_p$ 830 and $S_n$ 835 select the $S_i$ taps. The vector $S_p$ 830 is used to generate the current $I_p$ 820 and the vector $S_n$ 835 is used to generate the current $I_n$ 825. The $P_p$ 840 and $P_n$ 845 vectors select the taps $P_i$. The vectors $P_p$ 840 and $P_n$ 845 generate the currents $I_p$ 820 and $I_n$ 825 respectively. The vector $D_\alpha$ 850 is used to select α in 0.1 increments over the range [0–1].

Class B output currents exhibit zero-crossing distortion, which affect harmonic distortion suppression. To reduce distortion, an embodiment of the transmitter circuit 300 adds an additional common-mode current, $\beta I_{ref}$ 855. This additional current component results in class AB operation. The amount of current added is a trade-off between power dissipation and achievable linearity. Therefore, in 10 Mbaud mode, the average power dissipated and the common mode current are related by the equation $$P_{av} = (I + \beta I_{ref}) V_{dd}, \quad (22)$$

where I is the current drawn by the transmitter circuit when β equal zero. Also, $I_{ref}$ is a fixed reference current generated from a fixed band gap voltage that is available on the integrated circuit. $I_{ref}$ is also used in the amplitude control circuitry described below.

In an embodiment of the transmitter circuit 300, this common-mode current is chosen to be programmable via a 4-bit binary coded current switching DAC. The vector $T_D$ 860 selects the binary code that sets the value for β. A further embodiment of the transmitter circuit 300 implements an additional feature that turns the common-mode current off when no packets or link pulses are transmitted. This further allows a power savings during idle.

The supply current $I_{TN}$ 865 sets the input current to the driver 310 which in turn sets the peak driver output amplitude. This current is generated through feedback to attain a constant output amplitude over all process conditions.

In the 125 Mbaud mode, the common-mode current injectors, block AB 870 in FIG. 9, are powered down and the FIR filter blocks are preset to a specific tap configuration such that given $I_{TN}$ 865, the output amplitude meets the 100 Base-TX specifications.

Figure 10:
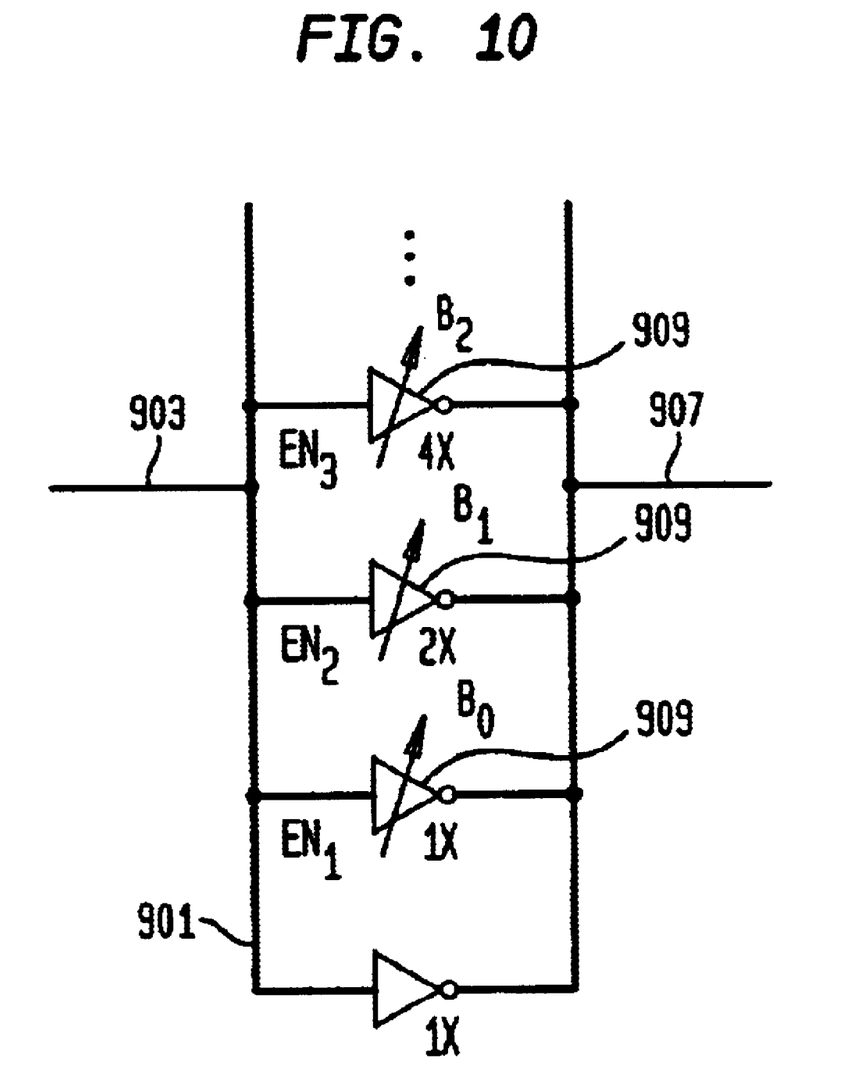
FIG. 10 is a schematic diagram illustrating an exemplary embodiment of a 6 bit array of binary scaled inverters used to programmably control the slew rate of the D signals.

As previously described, the output waveform is controlled by the D signals. In addition to the programmable rise/fall asymmetry feature via θ, as previously described, slew rate of the D signals is controlled. FIG. 10 is a schematic diagram illustrating an exemplary embodiment of an array of binary scaled inverters 901 used to programmably control the slew rate of the D signals. A 6 bit array of binary scaled inverters is envisioned, but other size arrays are also functional. Output of the array 907 represents the D signals that are electrically coupled to transistors 415, 430, 420, and 425. One array 901 is used for each D signal. Input to the array is represented by 903. The rise/fall asymmetry is determined by the number of inverters enabled in each array. The enabling of the inverters is accomplished by the B signals 909. A further embodiment of the transmitter circuit 300 utilizes a 3 bit programmable array to adjust the skew between D1 and D2, thus providing programmable adjustment of the duty cycle distortion of the output signal.

Figure 11:
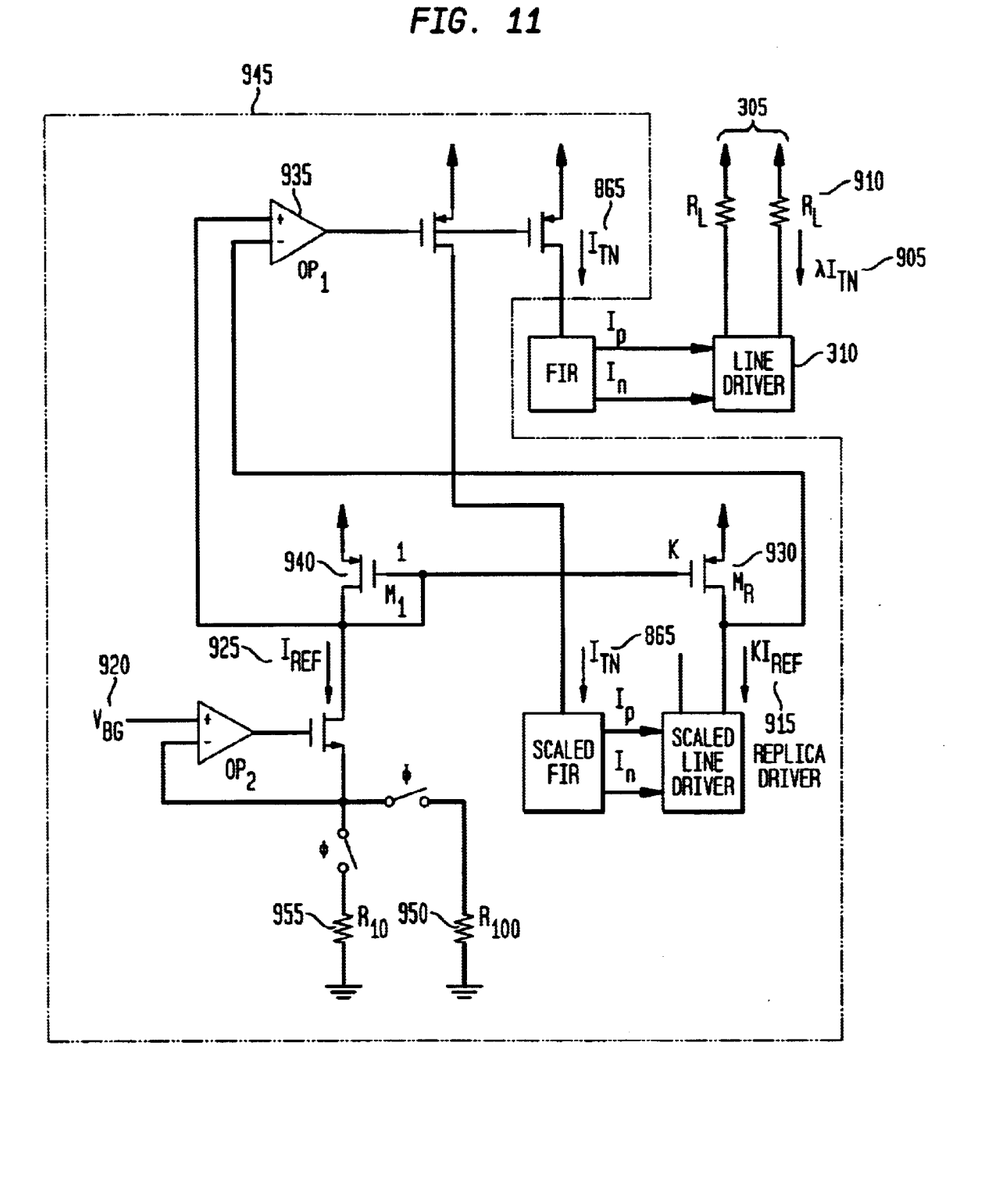
FIG. 11 is a block diagram illustrating an exemplary embodiment of the amplitude control utilized in the transmitter circuit.

FIG. 11 is a block diagram illustrating an exemplary embodiment of the amplitude control utilized in the transmitter circuit 300. In FIG. 11, the output amplitude is a scaled version of the current $I_{TN}$ 865 denoted here by $\lambda I_{TN}$ 905 in FIG. 11, and a multiplying load resistor $R_L$ 910. Specifically, the maximum output amplitude, $A_{max}$ is:

$$A_{max} = R_L \lambda I_{TN} \quad (23)$$

Since $R_L$ 910 is an external load resistor, amplitude variation will result from mirror mismatches due to fabrication tolerances and process variations even if $I_{TN}$ 865 was a fixed reference current. To minimize the variation, replica biasing and feedback is used to ensure that $A_{max} = A_{ref}$ where $$A_{ref} = K I_{REF} R_L \quad (24)$$

Hence, it is required that $K I_{REF}$ 915 = $\lambda I_{TN}$ 905. In FIG. 11, a bandgap voltage $V_{BG}$ 920, and an external (±1%) resistor, $R_{10}$ 955 or $R_{100}$ 950, are used to set a reference current $I_{REF}$ 925. A scaled replica circuit of the driver is terminated with a current $K I_{REF}$ 915 through a transistor $M_R$ 930. An op-amp, $OP_1$ 935, is used to keep the $V_{DS}$ of $M_R$ 930 the same as the $V_{DS}$ of $M_1$ 940 by adjusting the driver input current $I_{TN}$ 865. Hence, a precise current $K I_{REF}$ 915 is sourced by the replica driver which will also be replicated in the actual transceiver driver as $\lambda I_{TN}$ 905.

For a single channel implementation the external resistor, $R_{10}$ 955 or $R_{100}$ 950, is multiplexed depending upon whether 10 Mbaud or 125 Mbaud mode is selected. This allows independent selection of the reference current in each mode. For a multi-channel driver, the amplitude control circuit is modified to have two sets of the circuitry shown within the dotted outline 945 in FIG. 11. However, the external resistors, $R_{10}$ 955 or $R_{100}$ 950, are no longer multiplexed but are connected directly; one for the 10 Mbaud bandgap reference circuit and one for the 125 Mbaud bandgap reference circuit. The current $I_{TN}$ 865 entering the driver FIR filter is then multiplexed between the two master driver bias current outputs. This embodiment ensures that $V_{GSI} \approx A_{REF}$ hence reducing amplitude variation due to processing as much as possible without requiring Kelvin connections (i.e., more I/Os), post fabrication trimming, or elaborate compensation techniques.

What is claimed is:

1. A programmable transmitter integrated circuit formed on a single circuit for receiving binary encoded data signals including Manchester encoded data signals, and having a transmitter output coupled to one of an Ethernet and a Fast Ethernet for providing a transmitter output signal encoded in accordance with one of (1) Manchester encoded output data signals (2) MLT3 line code output data signals and (3) NRZI line code output data signals; comprising:

control logic for producing control signals, a FIR filter for providing FIR filtering to only the Manchester encoded data signals; and a single line driver coupled to said control logic and said FIR filter for producing MLT3 line code output data signals and NRZI line code output data signals in response to the control signals and producing said transmitter output signal as Manchester encoded output data signals, MLT3 line code data signals and NRZI line code data signals to one of the Ethernet and a Fast Ethernet.

2. The programmable transmitter circuit according to claim 1, wherein a supply voltage for powering the programmable transmitter circuit is at least 2.0 volts.

3. The programmable transmitter circuit according to claim 1, wherein the transmitter circuit is fabricated on a single integrated circuit with a surface area of approximately 0.65 mm².

4. The programmable transmitter circuit according to claim 1 wherein a data rate of the transmitter output signal is selectable.

5. The programmable transmitter circuit according to claim 4, wherein the data rate of the transmitter output signal is selectable from one of 10 Mbaud for the Manchester encoded output data signals and 125 Mbaud for one of the MLT3 line code output data signals and the NRZI line code output data signals.

6. The programmable transmitter circuit according to claim 5, wherein rise-time and fall-time asymmetry of the transmitter output signal, when the data rate of the transmitter output signal is 125 Mbaud, are related to average power dissipated by the programmable transmitter circuit, and wherein the average dissipated power is in accordance with the equation:

$$P_{av} = (20 + \theta) V_{dd}, \text{ wherein}$$

$V_{dd}$ is a supply voltage of the programmable transmitter circuit, $P_{av}$ is said average dissipated power, θ is a measure of common mode current, in milliamperes, adjustable between predetermined limits.

7. The programmable transmitter circuit according to claim 5, wherein said control logic includes a programmable array of binary scaled inverters for selectively controlling transmitter output signal rise-time, when the data rate of the transmitter output signal is 125 Mbaud.

8. The programmable transmitter circuit according to claim 5, wherein said control logic includes a programmable array of binary scaled inverters for selectively controlling transmitter output signal fall-time, when the data rate of the transmitter output signal is 125 Mbaud.

9. The programmable transmitter circuit according to claim 5, wherein said control logic includes a programmable array of binary scaled inverters for selectively controlling transmitter output signal duty cycle, when the data rate of the transmitter output signal is 125 Mbaud.

10. The programmable transmitter circuit according to claim 5 wherein harmonic distortion of the transmitter output signal is related to average power dissipated by the programmable transmitter circuit, when the data rate of the transmitter output signal is 10 Mbaud, in accordance with the following equation:

$$P_{av} = (I + \beta I_{ref}) V_{dd} \text{ wherein}$$

β is a measure of common mode current adjustable between predetermined limits,

I is an average current drawn by the transmitter circuit when β is zero, $V_{dd}$ is a supply voltage of the programmable transmitter circuit, $P_{av}$ is said average dissipated power, $I_{ref}$ is a fixed reference current.

11. The programmable transmitter circuit according to claim 1, wherein the transmitter output signal is coupled to a twisted pair conductor.

12. The programmable transmitter circuit according to claim 1, wherein wave shape of the transmitter output signal, when the data rate of the transmitter output signal is 10

Mbaud, is related to pre-emphasis weighting of said FIR filter, wherein pre-emphasis weighting is in accordance with the following equation:

$$\alpha = K_s/(K_s + K_p), \text{ wherein}$$

$$K_s + K_p = 1,$$

$K_p$ is a scalar value multiplied by a summation of coefficients representing a pre-emphasis component of said FIR filter, $K_s$ is a scalar value multiplied by a summation of coefficients representing a non pre-emphasis component of said FIR filter; and $\alpha$ is a measure of said pre-emphasis weighting adjustable between predetermined limits.

13. The programmable transmitter circuit according to claim 1 further comprising an amplitude control circuit for controlling an output voltage level of said transmitter output signal comprising:

a reference current generator for producing a reference current, a replica current generator for producing a replica current proportional to a supply current to said FIR filter, and a comparator for producing a control signal for varying said FIR filter supply current, responsive to said reference current and said replica current, wherein said output signal voltage level is proportional to said control signal.

14. The programmable transmitter circuit in accordance with claim 13, wherein said reference current generator produces a reference current for providing said Manchester encoded output data signals transmitted at a 10 Mbaud data rate.

15. The programmable transmitter circuit in accordance with claim 13, wherein said reference current generator produces a reference current for providing one of said MLT3 line code output data signals and NRZI line code output data signals transmitted at a 125 million baud data rate.

* * * * *